United States Patent
Shear

(10) Patent No.: US 7,630,326 B1
(45) Date of Patent: Dec. 8, 2009

(54) APPLICATION-DRIVEN AGILE NETWORKS

(75) Inventor: Robert M. Shear, El Cerrito, CA (US)

(73) Assignee: Dust Networks, Inc., Hayward, CA (US)

(*) Notice: Subject to any disclaimer, the term of this patent is extended or adjusted under 35 U.S.C. 154(b) by 512 days.

(21) Appl. No.: 11/371,317

(22) Filed: Mar. 7, 2006

Related U.S. Application Data

(60) Provisional application No. 60/661,075, filed on Mar. 11, 2005.

(51) Int. Cl.
H04L 12/28 (2006.01)

(52) U.S. Cl. .................................................. 370/254

(58) Field of Classification Search ............... 370/254; 709/220–226
See application file for complete search history.

(56) References Cited

U.S. PATENT DOCUMENTS

| | | | | |
|---|---|---|---|---|
| 5,367,523 A | * | 11/1994 | Chang et al. | 370/235 |
| 5,870,561 A | * | 2/1999 | Jarvis et al. | 709/238 |
| 6,038,231 A | * | 3/2000 | Dolby et al. | 370/394 |
| 6,275,975 B1 | * | 8/2001 | Lambrecht et al. | 716/14 |
| 6,539,427 B1 | * | 3/2003 | Natarajan et al. | 709/224 |
| 2006/0063523 A1 | * | 3/2006 | McFarland | 455/423 |

OTHER PUBLICATIONS

Chad Cook, Introduction to Encryption, securityfocus.com, Nov. 6, 2006.*

* cited by examiner

*Primary Examiner*—Pankaj Kumar
*Assistant Examiner*—Gautam Sharma
(74) *Attorney, Agent, or Firm*—Van Pelt, Yi & James LLP

(57) ABSTRACT

Configuring mesh networks based on an application is disclosed. An indication is received that a status is changed. In the event that the change in status requires a change in a mesh network configuration, a notice is transmitted to change the mesh network configuration and a local change required for the change in the mesh network configuration is initiated.

30 Claims, 12 Drawing Sheets

APPLICATION-DRIVEN AGILE NETWORKS

CROSS REFERENCE TO OTHER APPLICATIONS

This application claims priority to U.S. Provisional Patent Application No. 60/661,075 entitled APPLICATION-DRIVEN AGILE NETWORKS filed Mar. 11, 2005, which is incorporated herein by reference for all purposes.

BACKGROUND OF THE INVENTION

There are often competing interests in setting up a network. For example, high performance (e.g. high throughput, low latency, high reliability, etc.) in a network usually implies that the network will use more power, and so a low power usage implies lower performance. However, often it is desirable to have both high throughput and low power usage. For example, it is desirable that a camera placed at a remote location can send many pictures to the monitoring station (i.e. high throughput) without frequent trips to the remote location to change the battery that powers the camera and network node. It would be beneficial to be able to configure a network to be able to provide maximum performance despite constraints (e.g. available power).

BRIEF DESCRIPTION OF THE DRAWINGS

Various embodiments of the invention are disclosed in the following detailed description and the accompanying drawings.

DETAILED DESCRIPTION

Figure 1:
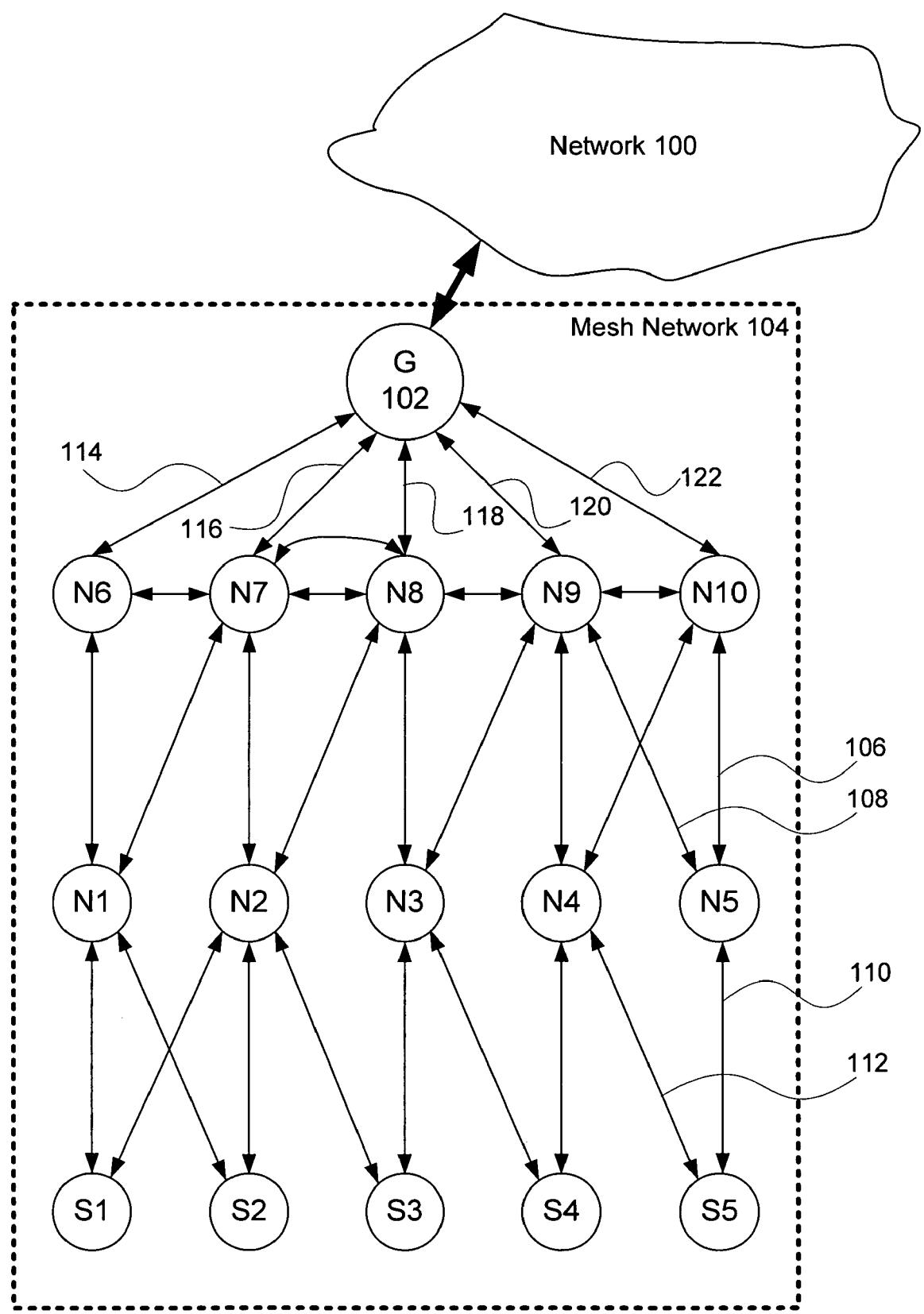
FIG. 1 is a block diagram illustrating an embodiment of a mesh network.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuring mesh networks based on specific application requirements is disclosed. An indication is received that a status is changed. The indication may be received from within the network—for example, the gateway or managing node or a sensor attached to a network node—or external from the network—for example, an alarm issued by a weather agency, an emergency warning, human intervention, or an application communicating with the network. The status change may arise from a building automation monitoring event, an industrial automation monitoring event, a security monitoring event, a structural monitoring event, an intrusion detection event, a machine health monitoring event, a low-battery monitoring event, or any other appropriate event that would change a status. In the event that the change in status requires a change in a mesh network performance, and therefore configuration, a notice is transmitted to change the mesh network configuration and the local change required for the change in the mesh network configuration is initiated. The mesh network configuration may support maximum longevity by preserving battery life, low latency in message transmission from the nodes to a gateway node or low latency between messages transmitted, high throughput from a node to a gateway node where multiple paths from the node are activated to carry messages from the node to the gateway node, high redundancy where multiple copies of a message are sent along one or along multiple paths to ensure that the message reaches one or more gateways, or high security where the paths are arranged to avoid less secure areas in the network or the network or data packages are configured to be more secure. The configuration of the network is changed by changing one or more elements of the network configuration: capacity of links between network nodes, rate at which network nodes report data, number of connections per node, number of routes from source to destination, alignment of transmissions in time, frequency and diversity of paths, radio characteristics such as power levels and data rates, message encoding and segmenting methods, or any other appropriate network element.

FIG. 1 is a block diagram illustrating an embodiment of a mesh network. In the example shown, mesh network 104 can communicate with network 100. Network 100 is a communication network and may be a local area network, a wide area network, the Internet, a wired network, a wireless network, or any other appropriate communication network. Mesh network 104 includes a gateway node, mesh network nodes, and sensor mesh network nodes. The gateway node is represented in FIG. 1 as G 102. The gateway node is able to communicate directly with network 100 and with mesh network nodes. For example, G 102 is able to directly communicate with N6, N7, N8, N9, and N10 via connections represented by 114, 116, 118, 120, and 122 respectively. The gateway node may also act as a mesh network coordinator sending to and receiving from the mesh network nodes and the sensor mesh network nodes information/configuration/status updates. In some embodiments, there are multiple gateway nodes that can communicate with the same network (e.g., network 100) or one or more different networks. In some embodiments, multiple gateway nodes are used to increase the throughput to network 100. Mesh network nodes are represented in FIG. 1 as N1-N10. A mesh network node can communicate with other mesh network nodes, the gateway node, and/or sensor mesh network nodes. In some embodiments, all mesh network nodes are sensor mesh network nodes. For example, mesh network node N5 is able to communicate directly with mesh network node N10 via a connection represented by 106, with mesh network node N9 via a connection represented by 108, and with sensor mesh network node S5 via a connection represented by 110. In various embodiments, the connections allow communication only in one direction (i.e., to a node or from a node) or in both directions (i.e., both to and from a node). A sensor mesh network node can communicate with a gateway node (not shown in this example), other sensor mesh network nodes (not shown in this example), and/or mesh network nodes. For example, sensor mesh network node S5 is able to communicate directly with mesh network node N5 via a connection represented by 110 and with mesh network node N4 via a connection represented by 112. In some embodiments, sensor mesh network nodes communicate directly with a gateway node.

In the example shown in FIG. 1, the gateway, mesh network nodes, and sensor network nodes communicate via radio transmitters and receivers using a packet. A packet may include a header section and a data section. The packet header may include information regarding packet type, time sent, source node, destination node, node health, number of tries for a hop, number of hops, etc. The packets are sent during defined time slots on defined frequencies using a time division multiple access (TDMA) methodology. In various embodiments, other methodologies for wireless or wired communications are used such as carrier sense multiple access (CSMA), code division multiple access (CDMA), global system for mobile communication (GSM), Transmission Control Protocol/Internet Protocol (TCP/IP), or any other appropriate network communication methodologies.

Figure 2:
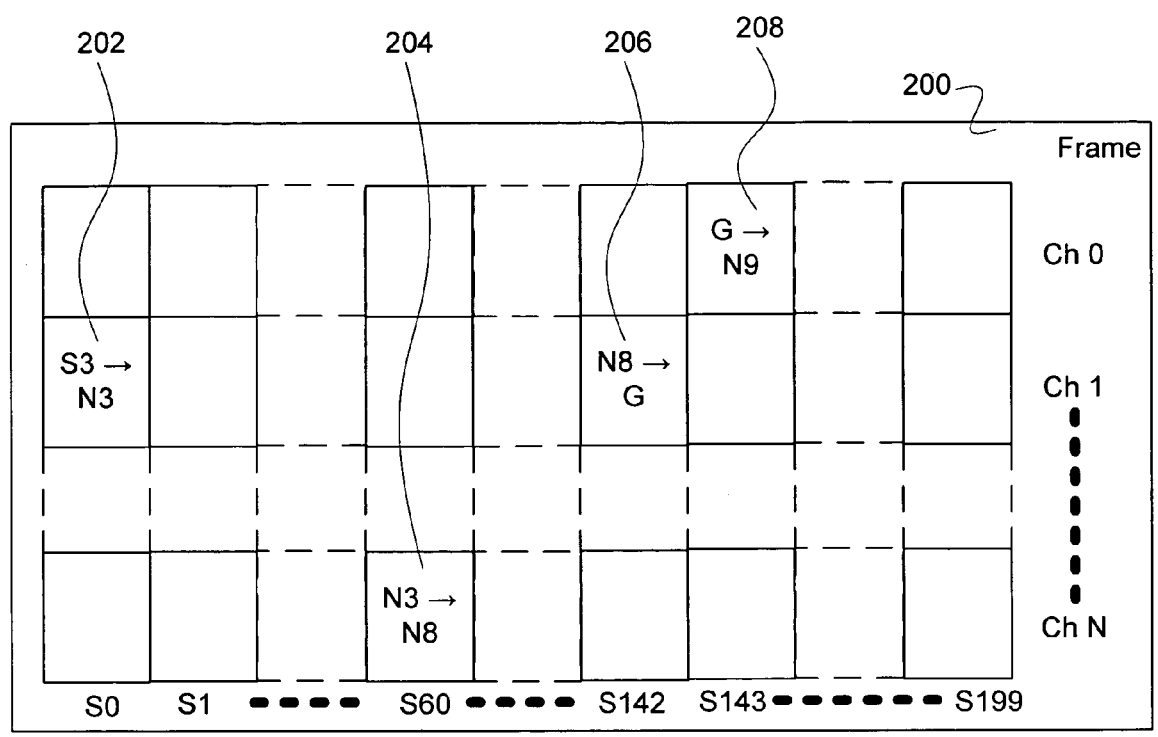
FIG. 2 is a block diagram illustrating an embodiment of a frame.

FIG. 2 is a block diagram illustrating an embodiment of a frame. In the example shown, frame 200 includes time slots and frequency slots for transmitting and receiving packets between nodes of a mesh network such mesh network 104. Frame 200 is repeated after executing the transmissions/receptions for all of its time slots. The network can support several different frames either running at different times or running concurrently. Some frames have only a few slots with communications to minimize power used by the nodes in the network. Some frames minimize latency, maximize throughput, maximize redundancy, or increase security. Frame 200 contains N channels (represented by Ch 0, Ch 1, and Ch N) and 200 time slots (represented by S0, S1, S60, S142, S143, and S199). Ch 0, Ch 1, and Ch N may be assigned to fixed frequencies or a pseudo-random sequence of frequencies available to the network. All transmission links in the mesh network are assigned cells in the frame during which then can communicate. The transmissions and receptions for the frame are represented by 202, 204, 206, and 208. In Ch 1-S0 cell, node S3 sends to node N3. In Ch N-S60 cell, node N3 sends to node N8. In Ch 1-S142, node N8 sends to node G. In Ch 0-S143, node G sends to node N9. In some embodiments, capacity, or communication volume, in the network is not specified using frames. In various embodiments, scheduling for communications between two network nodes is described using a table, a formula, or any other appropriate way of scheduling communications between nodes of the network.

Figure 3:
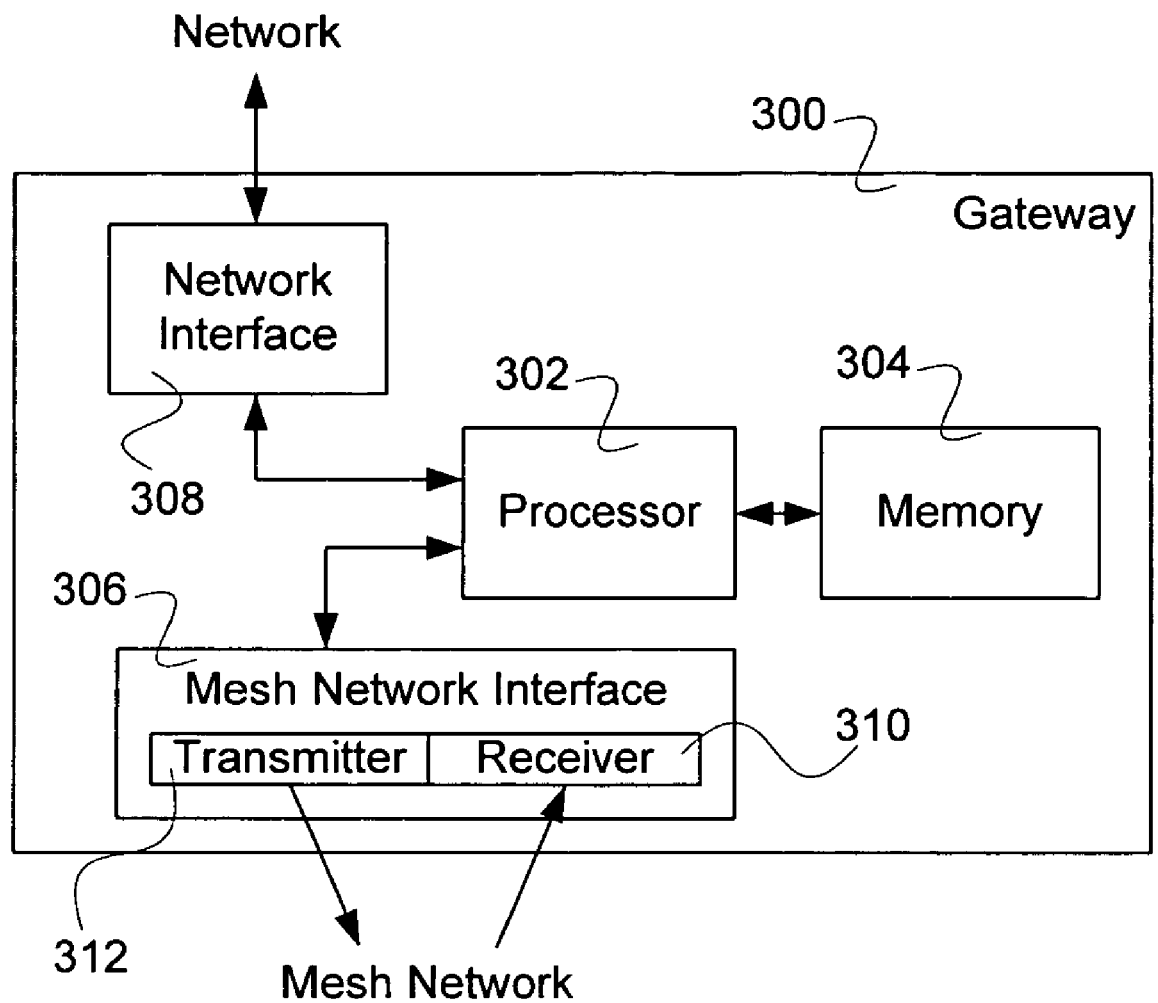
FIG. 3 is a block diagram illustrating an embodiment of a gateway of a mesh network.

FIG. 3 is a block diagram illustrating an embodiment of a gateway of a mesh network. In some embodiments, the gateway 300 of FIG. 3 is used to implement G 102 in FIG. 1. In the example shown, gateway 300 includes processor 302, memory 304, mesh network interface 306, and network interface 308. Processor 302 runs software that when executed manages the mesh network. Management of the mesh network can include network setup, adding nodes, removing nodes, adding frames to the network, removing frames, monitoring status, optimizing network performance by reconfiguring frames, time synchronization, and/or any other appropriate network management function. Memory 304 provides storage for processor 302 including run-time storage and instruction storage. Mesh network interface 306 includes receiver 310 and transmitter 312. Receiver 310 receives communications in the form of packets transmitted from the mesh network. Transmitter 312 transmits communications in the form of packets to the mesh network. Network interface 308 communicates with a communication network. Information from the mesh network is passed directly to or processed by gateway 300 using processor 302 before passing to the communication network. In some embodiments, gateway 300 is line powered so that power limitations due to finite battery reserves are not an issue. In various embodiments, network management is accomplished by a remote application or is coordinated by a node in the network.

Figure 4:
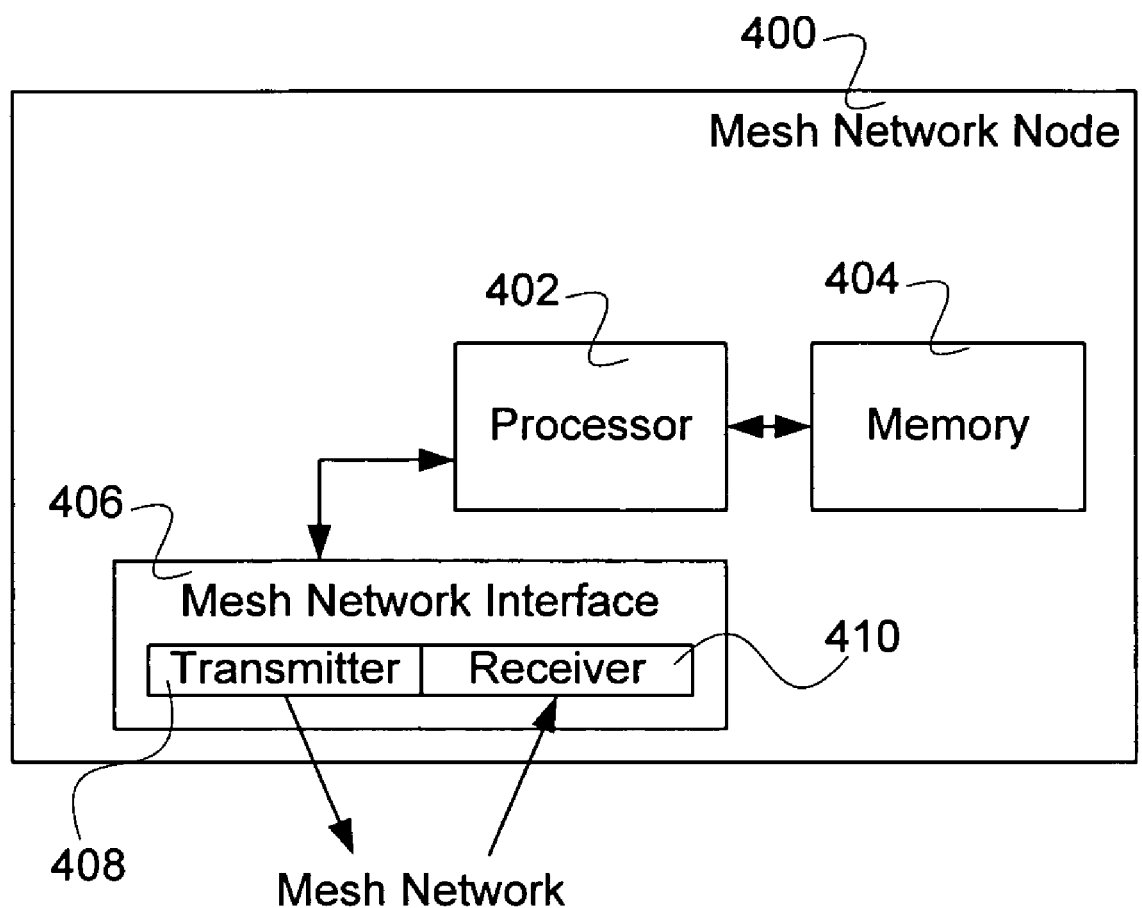
FIG. 4 is a block diagram illustrating an embodiment of a mesh network node of a mesh network.

FIG. 4 is a block diagram illustrating an embodiment of a mesh network node of a mesh network. In some embodiments, the mesh network node 400 of FIG. 4 is used to implement nodes N1-N10 in FIG. 1. In the example shown, mesh network node 400 includes processor 402, memory 404, and mesh network interface 406. Processor 402 runs software that when executed operates the mesh network node. Operation of the mesh network node can include setup, receiving messages, transmitting messages, adding capacity, removing capacity, providing status reports to a gateway manager such as gateway 300 in FIG. 3, time synchronization, and/or any other appropriate operating function. Memory 404 provides storage for processor 402 including run-time storage and instruction storage. Mesh network interface 406 includes receiver 410 and transmitter 408. Receiver 410 receives communications in the form of packets transmitted from the mesh network. Transmitter 408 transmits communications in the form of packets to the mesh network. In some embodiments, mesh network node 400 is usually battery powered so that power limitations due to finite battery reserves are an issue.

Figure 5:
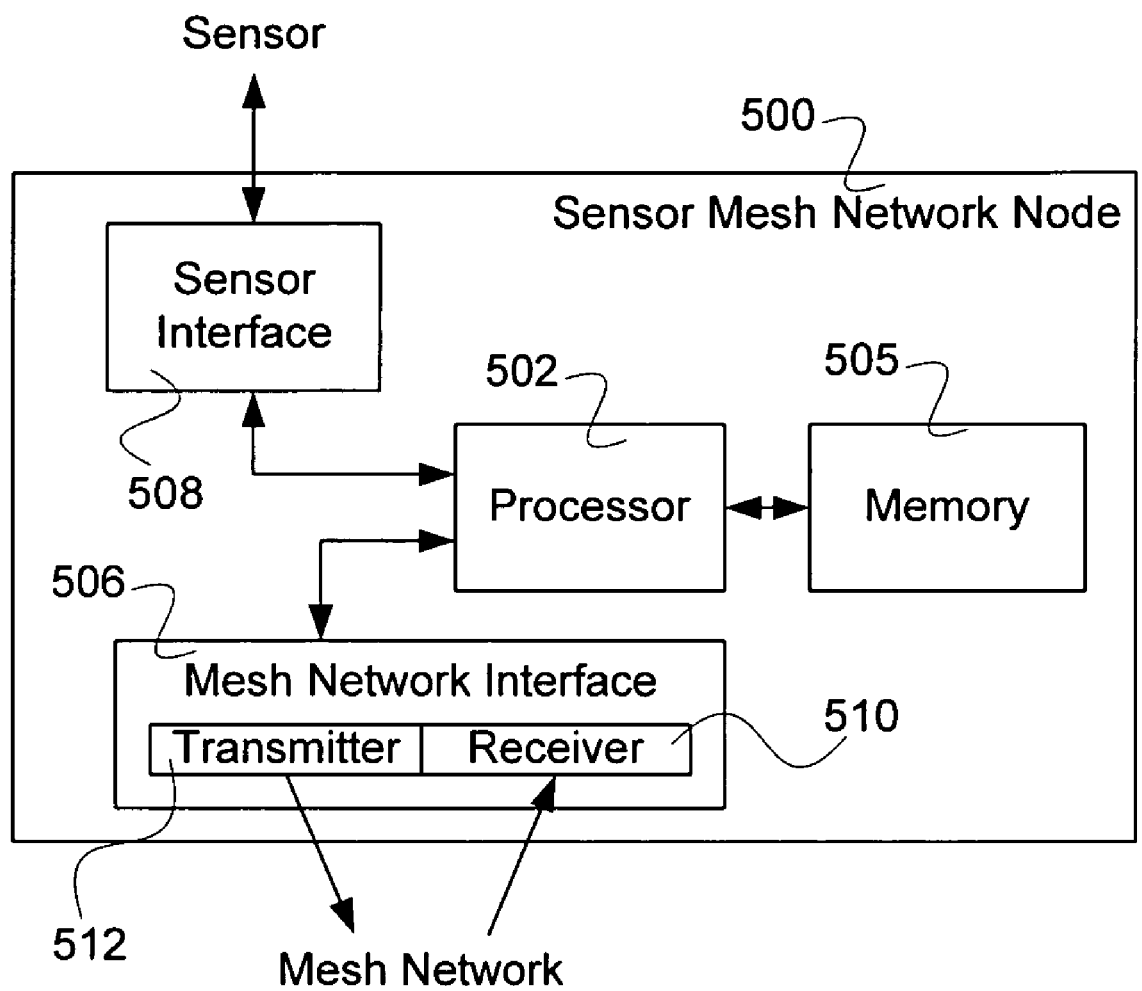
FIG. 5 is a block diagram illustrating an embodiment of a sensor mesh network node of a mesh network.

FIG. 5 is a block diagram illustrating an embodiment of a sensor mesh network node of a mesh network. In some embodiments, the sensor mesh network node 500 of FIG. 5 is used to implement S1-S5 in FIG. 1. In the example shown, sensor mesh network node 500 includes processor 502, memory 504, mesh network interface 506, and sensor interface 508. Processor 502 runs software that when executed operates the sensor mesh network node. Operation of the sensor mesh network node can include node or sensor setup, receiving messages, transmitting messages, adding frames, removing frames, providing status to a gateway such as gateway 300 in FIG. 3, time synchronization, and/or any other appropriate operation function. Memory 504 provides storage for processor 502 including run-time storage and instruction storage. Mesh network interface 506 includes receiver 510 and transmitter 512. Receiver 510 receives communications in the form of packets transmitted from the mesh network. Transmitter 512 transmits communications in the form of packets to the mesh network. Sensor interface 508 communicates with a sensor. Sensor types that can be connected to sensor mesh network node include temperature sensors, strain sensors, image sensors, vibration sensors, fluid level sensors, chemical sensors, gas sensors, radiation detectors, position sensors, acceleration sensors, inclination sensors, shock sensors, infrared sensors, sound sensors, current sensors, voltage sensors, or any other appropriate sensor. Information from the sensor is passed directly to or processed by sensor mesh network node 500 using processor 502 before passing to the mesh network. In some embodiments, sensor mesh network node 500 is usually battery powered so that power limitations due to finite battery reserves are an issue.

Figure 6:
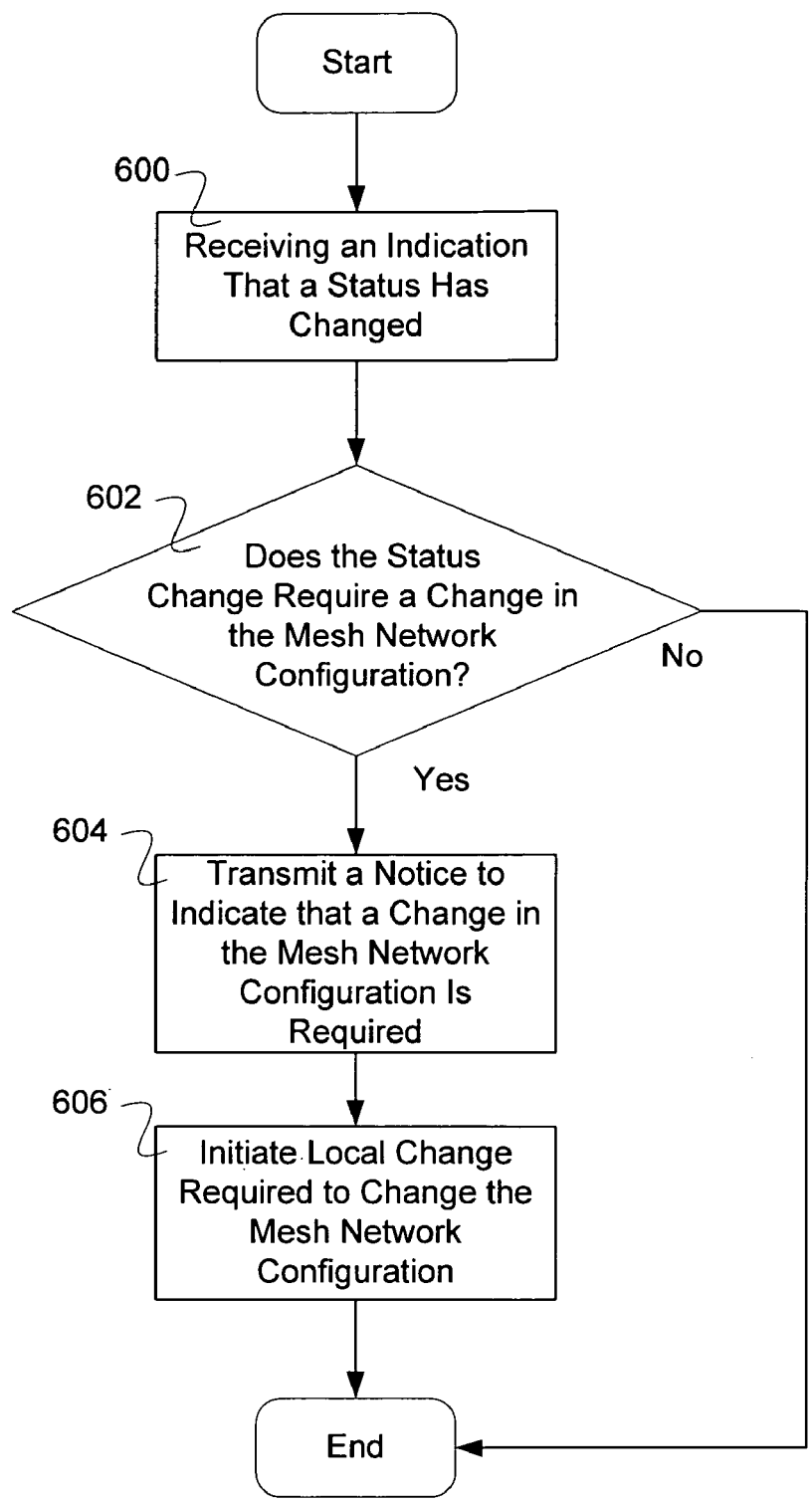
FIG. 6 is a flow diagram illustrating an embodiment of a process for configuring mesh networks based on an application.

FIG. 6 is a flow diagram illustrating an embodiment of a process for configuring mesh networks based on an application. In some embodiments, the process of FIG. 6 is executed on a sensor mesh network node or on a gateway node. In various embodiments, the sensor mesh network node that receives a measurement leading to a status change or a gateway node having received information from a sensor mesh network node regarding a measurement indicating that a change to the network configuration is required initiates the change in configuration for the network. In the example shown, in 600 an indication is received that a status has changed. The indication can be information from a message in a packet, a signal from a sensor, a measurement from a sensor, and/or information derived from a sensor reading, human intervention, or some external system—for example, a temperature or an indication that the temperature has risen above a threshold. In 602, it is determined if the status change requires a change in mesh network configuration. For example, if the abovementioned temperature being above a threshold indicates that a process is not in compliance, then the mesh network may need to more tightly monitor and report temperatures to indicate exactly when the temperature is back in compliance. In various embodiments, a change status is because of a structural monitoring event, an intrusion detection event, a machine health monitoring event, or any other appropriate event that changes the status. If a change in mesh network configuration is required, then in 604 a notice is transmitted to indicate that a change to the mesh network configuration is required. The notice (e.g., a message in a packet) can be sent to another mesh network nodes and/or a gateway node. In various embodiments, the change to the network configuration comprises a network configuration to increase lifetime of a battery of a node, decrease latency in the transmission of a message sent from a source to a destination, increase throughput of packets through the network, increase reliability of a message reaching its destination, increase security of a message sent through the mesh network, and/or any other appropriate change in configuration. In 606, the local change required to change the mesh network configuration is initiated, and the process ends. In various embodiments, the local change required comprises changing the mesh network routing, adding capacity, removing capacity, changing the radio characteristics of a node, changing the encoding for data in a packet, fragmenting data into a plurality of packets, and/or any other appropriate local changes. If a change in the mesh network is not required, then in the process ends.

Figure 7:
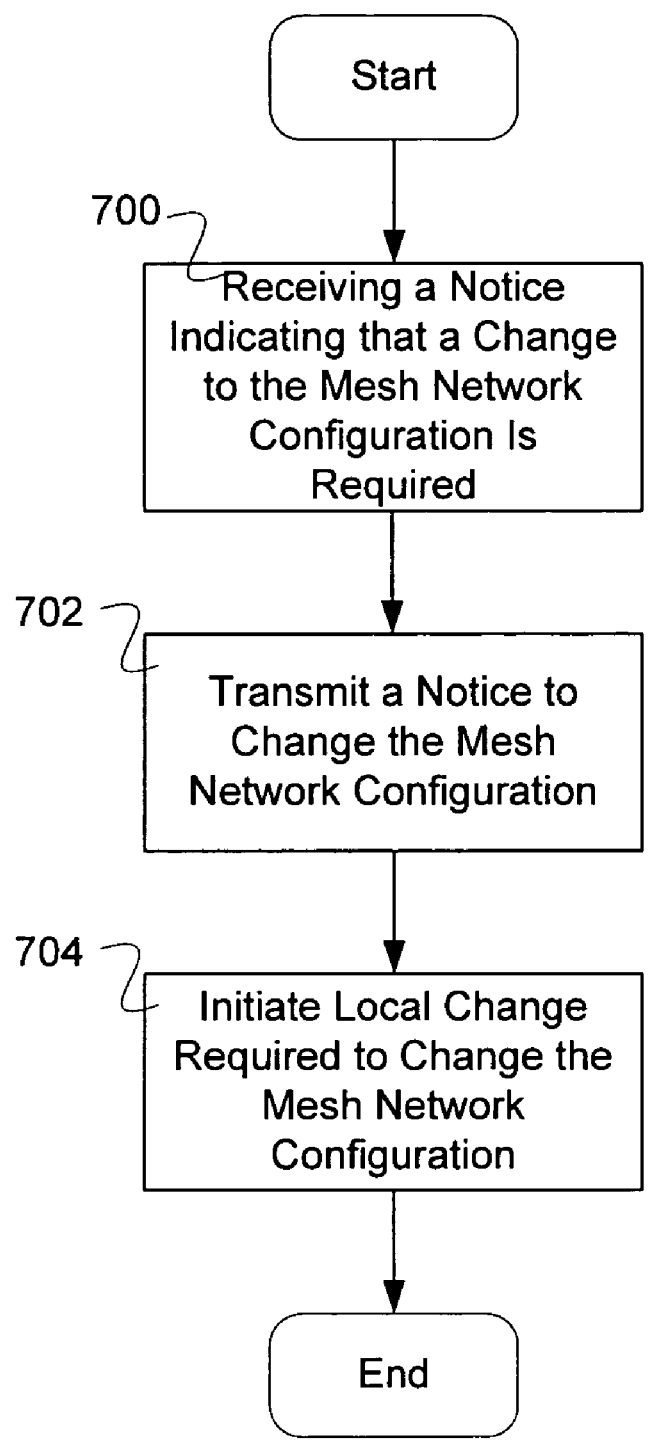
FIG. 7 is a flow diagram illustrating an embodiment of a process for configuring mesh networks based on an application.

FIG. 7 is a flow diagram illustrating an embodiment of a process for configuring mesh networks based on an application. In various embodiments, the process of FIG. 7 is executed on sensor mesh network nodes, gateway nodes, and/or mesh network nodes. Nodes that do not initiate the change in configuration for the network execute the process in FIG. 7 to propagate the network change indication and to change the network state locally. In the example shown, in 700 a notice is received indicating that a change to the mesh network configuration is required. In 702, a notice is transmitted to indicate that a change to the mesh network configuration is required. In 704, the local change required to change the mesh network configuration is initiated, and the process ends.

Figure 8:
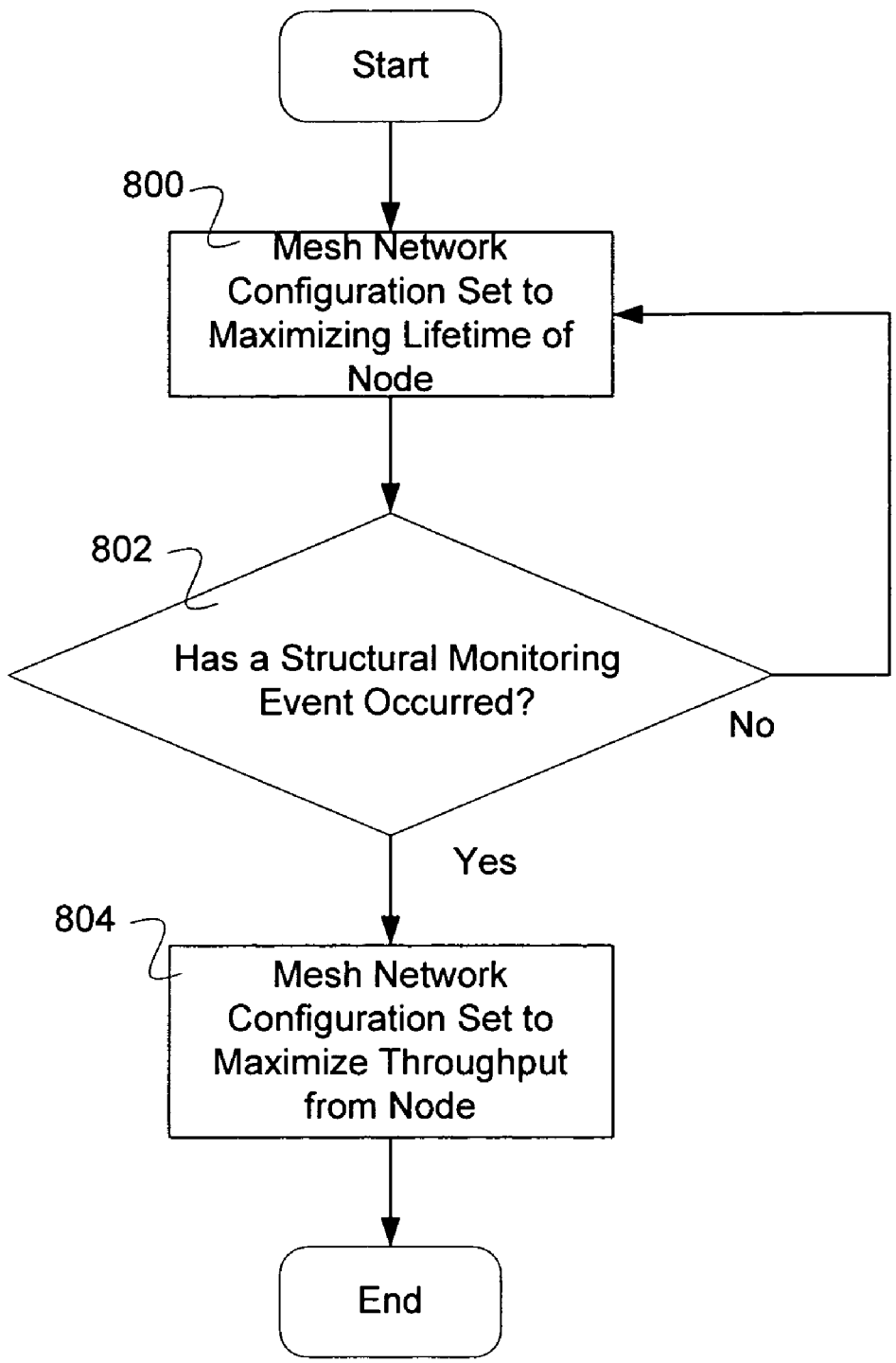
FIG. 8 is a flow diagram illustrating an embodiment of a process for mesh network configuration change driven by a structural monitoring application.

FIG. 8 is a flow diagram illustrating an embodiment of a process for mesh network configuration change driven by a structural monitoring application. The process in FIG. 8 is executed on a sensor mesh network node such as S3 in FIG. 1. This process can be useful when monitoring a structure that can critically fail. In the case of failure it can be important to understand the exact failure mechanisms so that extensive measurement information measured just before a failure point is important to record. For example, a mesh network is installed on a bridge with each node placed at critical points on the structure. Each node in the network takes readings from four sensors: strain, vibration, temperature, and inclination. The application is designed to detect any structural events and to report back to a monitoring application for further processing and alarming. Wireless nodes are placed on the structure; the gateway node is in an electrical closet and has an active Ethernet connection; the monitoring application is in a data center and linked to the gateway via the Ethernet.

In the example shown, in 800 the network state is set to maximize lifetime of the node. Maximizing lifetime includes synchronization maintenance for the node, route maintenance for the node, no or few data transmissions, and sensing and assessing if there is a network configuration change required—for example, by comparing to a threshold. In some embodiments, the process in FIG. 8 is executed on a gateway node such as gateway G 102 in FIG. 1; the gateway receives a data packet from one or more sensor mesh network nodes with sensor measurement information that indicates either directly or after processing by the gateway that a mesh network configuration change is required. For example, the sensor mesh network node makes a measurement once a minute and reports measurements to the gateway every five minutes enabling the node to operate for 15 years on available battery power.

In 802, it is determined if a structural monitoring event has occurred. A structural monitoring event can be that a sensor has a reading above a threshold or multiple sensors each have readings above their respective thresholds. If a structural monitoring event has occurred, then in 804 the network configuration is set to maximize throughput of the network from one or more nodes. For example, if a sensor registers readings above its threshold, then the sensor mesh network node determines that a structural monitoring event has occurred and indicates that a change to the mesh network configuration is required. In some embodiments, the gateway indicates that a structural monitoring event has occurred in the event that at least a number (e.g., three) sensors in the network register readings above their respective thresholds. Maximizing throughput of the network maximizes information gathered from one or more of the nodes in the mesh network regardless of power consumption—for example, a node takes a measurement every two seconds and reports back the measurement results every ten seconds. This state is maintained until a node's battery dies.

Figure 9:
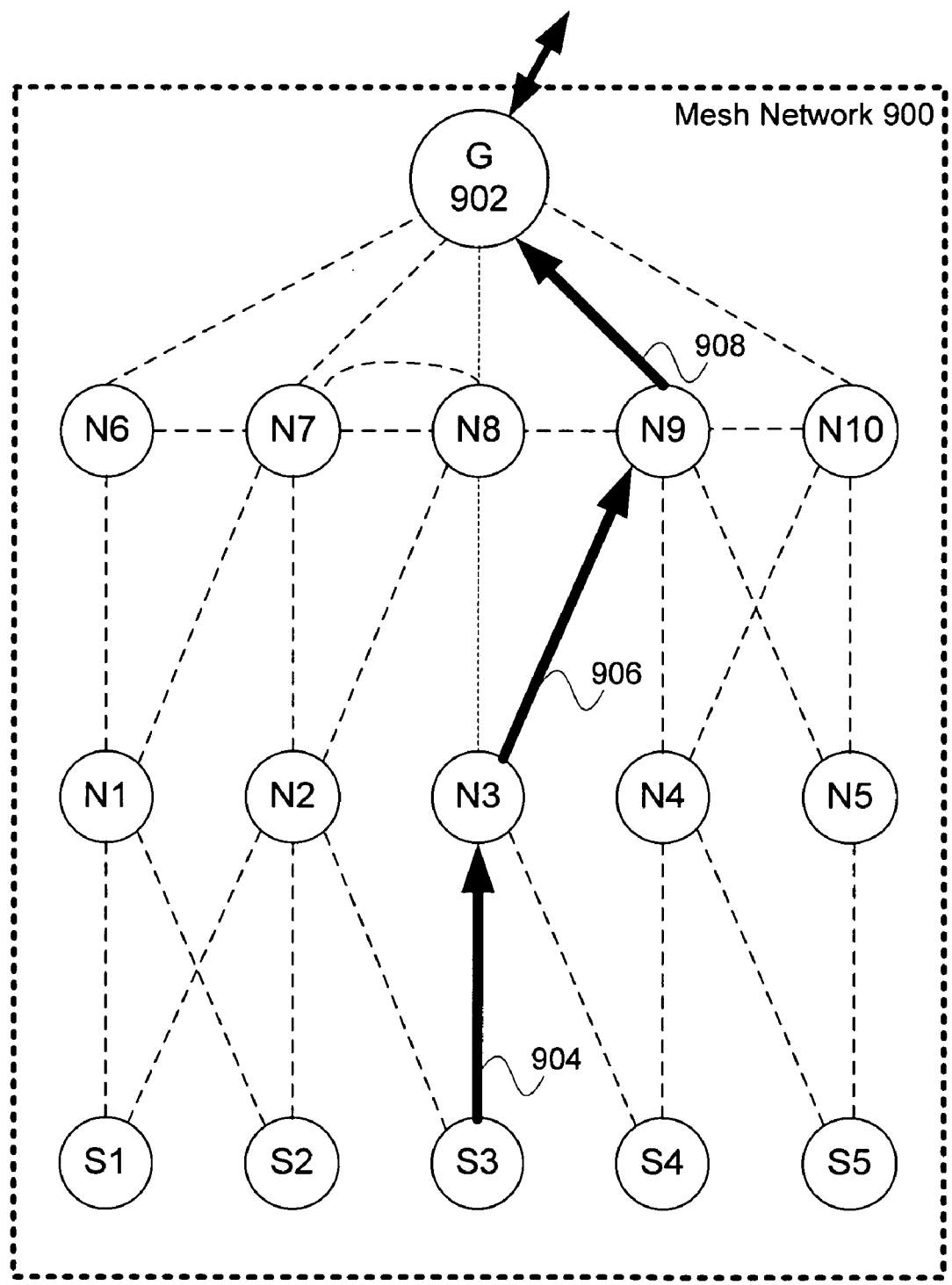
FIG. 9 is a block diagram illustrating an embodiment of mesh network in the configuration for maximizing lifetime where traffic is highlighted from one node to the gateway.

FIG. 9 is a block diagram illustrating an embodiment of mesh network in the configuration for maximizing lifetime where traffic is highlighted from one node to the gateway. In the example shown, mesh network 900 is similar to mesh network 104. Highlighted with heavy arrows in FIG. 9 are communication links between S3 and N3, N3 and N9, and N9 and G 902 represented by 904, 906, and 908 respectively. These communication links can be supported as part of the configuration that maximizes lifetime. Maximizing lifetime includes operations that minimally support the node and its function and can include synchronization maintenance, route maintenance, sensing and assessing if there is a change to mesh network configuration required, and few or no data transmissions. Synchronization maintenance includes receiving (and possibly transmitting on) clock information and synchronizing the local clock to the received clock information. Route maintenance includes transmitting and receiving information to the linked node(s), rebuilding lost links, removing links that do not work any longer, establishing alternate links if necessary, and any other appropriate route maintenance operation. Data transmissions are suppressed or are infrequent to keep power consumption low until a status has changed that indicates a mesh network configuration change is required. Receiving the output measurements of one or more attached sensors and processing the measurements to establish if a threshold has been exceeded or any other condition or status which would indicate that a change in mesh network configuration is required.

Figure 10:
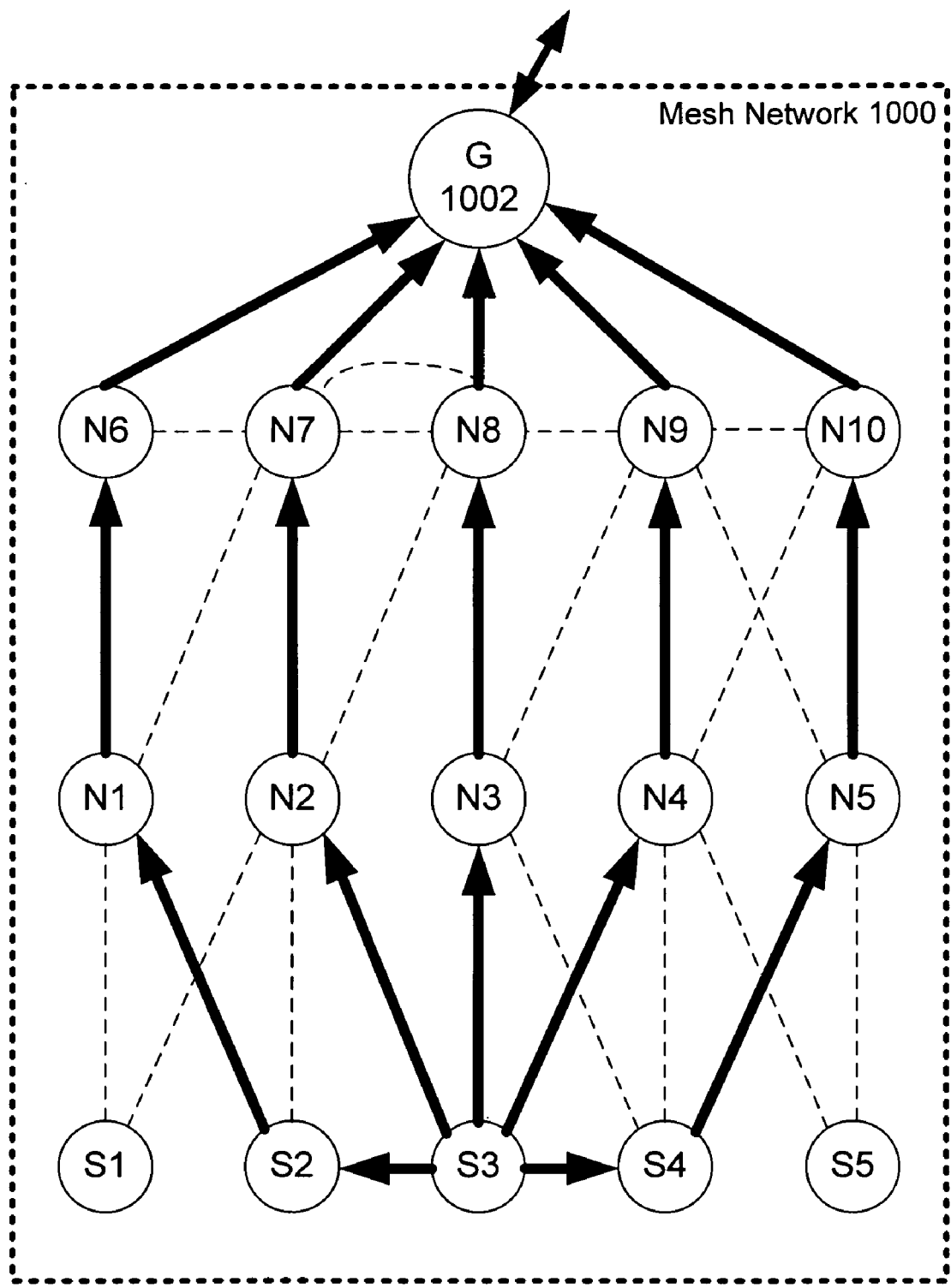
FIG. 10 is a block diagram illustrating an embodiment of mesh network in the configuration for maximizing throughput where traffic is highlighted from one node to the gateway.

FIG. 10 is a block diagram illustrating an embodiment of mesh network in the configuration for maximizing throughput where traffic is highlighted from one node to the gateway. In the example shown, mesh network 1000 is similar to mesh network 104. Highlighted with heavy arrows in FIG. 10 are communication links between S3 and G 1002. These five parallel communication links can be supported as part of the configuration that maximizes throughput. Maximizing throughput can be achieved by using multiple parallel routes, upping power on the transmitter to skip over nodes and reduce the number of hops to a destination node (e.g., the gateway node), prioritization within a queue on a node for those messages coming from a sensor node to the gateway node so that the high priority messages will not wait at all or not as much as other entries in the queue, change the characteristics for the radio transmission to increase the data rate, and/or any other appropriate measures for increasing the throughput of the mesh network.

Figure 11:
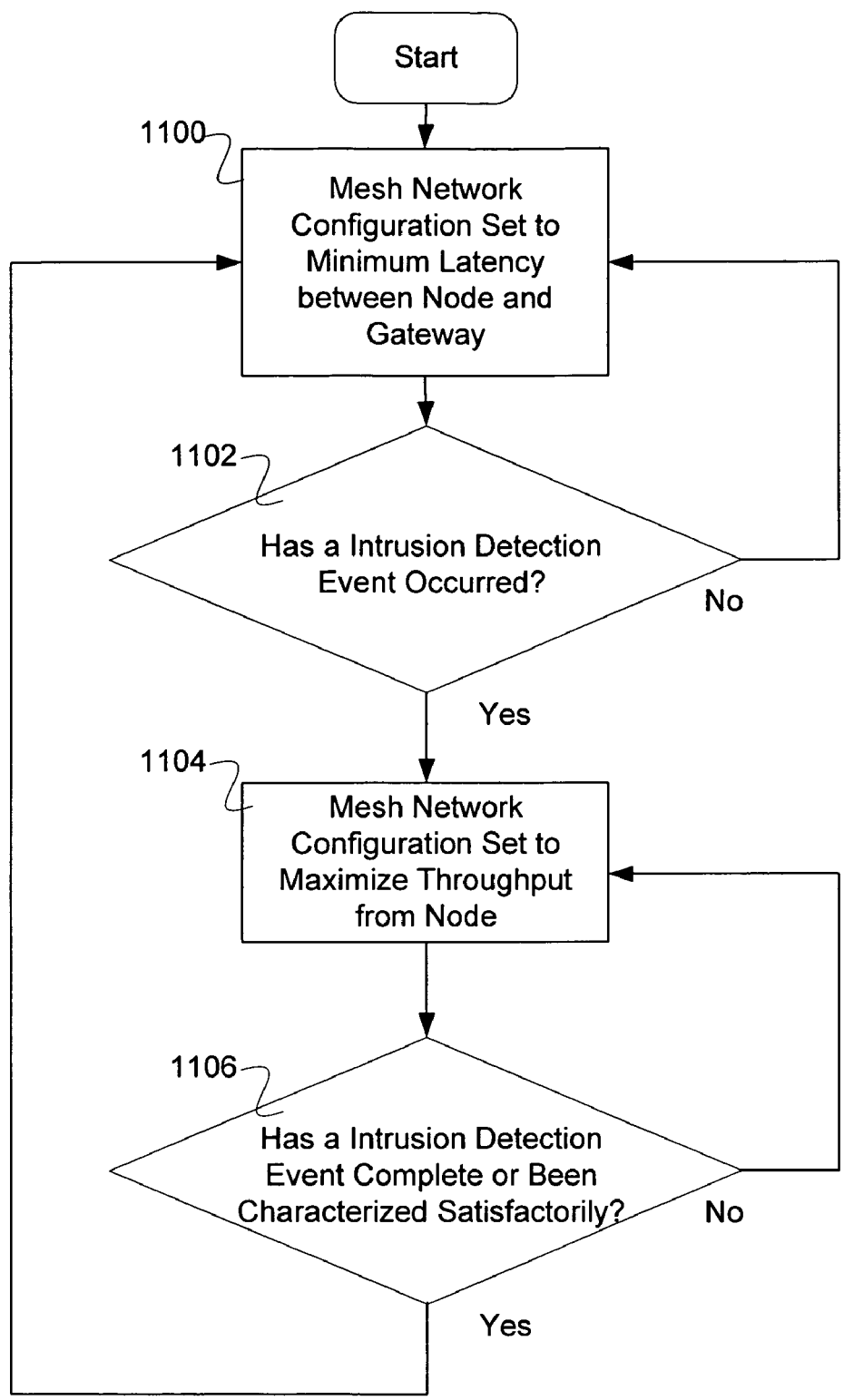
FIG. 11 is a flow diagram illustrating an embodiment of a process for mesh network configuration change driven by an intrusion detection application.

FIG. 11 is a flow diagram illustrating an embodiment of a process for mesh network configuration change driven by an intrusion detection application. The process in FIG. 11 is executed on a sensor mesh network node such as S3 in FIG. 1. This process can be useful when monitoring a security breech. In the case of a breech it can be important to understand the nature of the breech (e.g., person, animal, tree branch, etc.) so that extensive measurement information is important to transmit until the breech is characterized. For example, a wireless mesh network is installed on a fence that secures the perimeter of an oil processing facility—each node is placed at equal-spacing along the length of the fence. Each node in the network takes readings from four sensors: infrared, vibration, sound and video. The purpose of the network is to detect any persons near the fence or any motion along the fence and report them back to a monitoring application for further processing and alarming. Wireless nodes are placed along the fence; network gateway is in the building and has an active Ethernet connection; monitoring application is in a data center and linked to the gateway via the Ethernet.

In the example shown, in 1100 the network state is set to minimize latency from the node. Minimizing latency can be achieved by cascading time slots so that transmissions have a minimum latency, parallelization of large data packets along multiple routes to have all data arrive as fast as possible, higher priority for message that require low latency so that they do not sit in a node's queue, use of multiple gateway destinations so that the messages (or packets) get out of the mesh network to a higher bandwidth network as fast as possible, change radio characteristics to enable higher bandwidths so that the frame can be cycled faster, increase power of the transmitter to minimize hops to the destination node, and/or any other appropriate configuration of the network to achieve low latency. In some embodiments, the process in FIG. 11 is executed on a gateway node such as gateway G 102 in FIG. 1; the gateway receives a data packet from one or more sensor mesh network nodes with sensor measurement information that indicates either directly or after processing by the gateway that a mesh network configuration change is required. For example, the sensor mesh network node makes a measurement and reports to the gateway once a minute enabling the node information to reach the monitoring application in 5 seconds.

In 1102, it is determined if an intrusion detection event has occurred. An intrusion detection event can be that a sensor has a reading above a threshold or multiple sensors each have readings above their respective thresholds. If an intrusion detection event has occurred, then in 1104 the network configuration is set to maximize throughput of the network from one or more nodes. For example, if a sensor registers readings above its threshold, then the sensor mesh network node determines that an intrusion detection event has occurred and indicates that a change to the mesh network configuration is required. In some embodiments, the gateway indicates that an intrusion detection event has occurred in the event that a sensor in the network registers a reading above its threshold. Maximizing throughput of the network maximizes information gathered from one or more of the nodes in the mesh network regardless of power consumption—for example, a node is enabled to transmit real-time video to the gateway. In 1106, it is determined if the intrusion detection event is completed or has been satisfactorily characterized. If the event is completed or satisfactorily characterized, then control passes to 1100. If the event is not complete or not satisfactorily characterized, then control passes to 1104. In some embodiments, a change to the mesh network configuration to increase throughput comprises a mesh network configuration wherein a plurality of gateways are coupled to a network enabling higher throughput to the network (e.g., network 100).

In some embodiments, an event such as an intrusion detection event indicates that a change in configuration is required where the configuration is a high security configuration. High security for the network can include encrypting messages with a more secure encoding (e.g., more rounds of encryption such as 20 rounds of XTEA instead of 10 or a different encoding method such as AES), change the routing of packets away from areas considered less secure (e.g., perimeter regions of the network, fragmenting the message and sending the encoded fragments along different paths to their destination and reassembling and decoding the messages at the destination, or any other appropriate method for increasing security in the mesh network.

Figure 12:
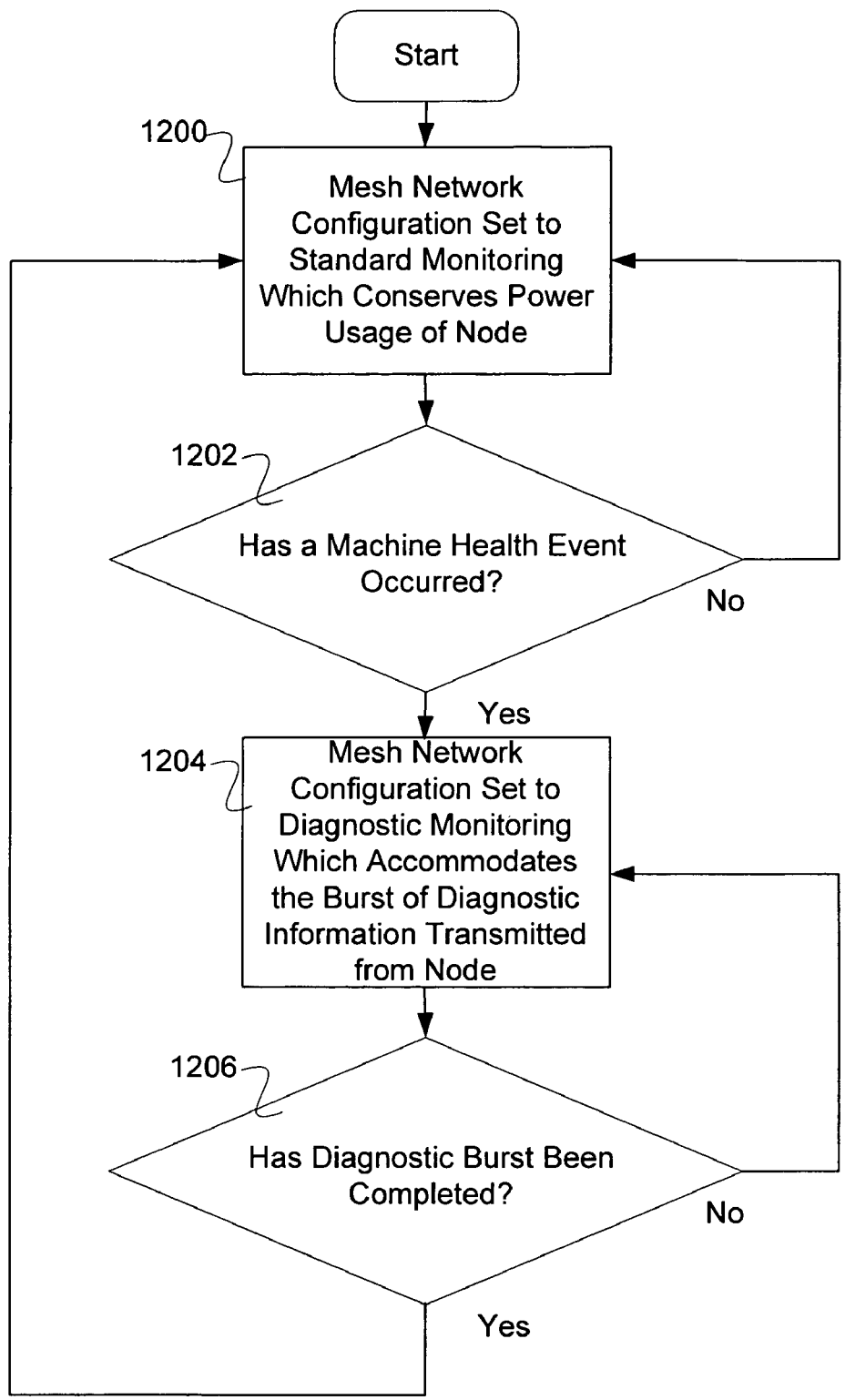
FIG. 12 is a flow diagram illustrating an embodiment of a process for mesh network configuration change driven by a machine health monitoring application.

FIG. 12 is a flow diagram illustrating an embodiment of a process for mesh network configuration change driven by a machine health monitoring application. The process in FIG. 12 is executed on a sensor mesh network node such as S3 in FIG. 1. This process can be useful when monitoring a factory machine. In the case of a factory machine problem it can be important to understand the nature of the problem (e.g., lack of maintenance, low on consumables, over heating, etc.) so that a burst of full diagnostic measurement information is important to transmit. For example, a wireless mesh network is installed across a factory floor to monitor the condition of each electrical motor. Each node in the network takes readings from four sensors: temperature, current draw, vibration, and alarm line. The purpose of the network is to quantify the operational conditions of each motor and report back to a monitoring application for further processing and alarming. Wireless nodes are placed on each motor; network gateway is in an electrical panel and has an active Ethernet connection; monitoring application is in a data center and linked to the gateway via the Ethernet.

In the example shown, in 1200 the network state is set to standard monitoring mode which conserves power usage of the node. In some embodiments, the process in FIG. 12 is executed on a gateway node such as gateway G 102 in FIG. 1; the gateway receives a data packet from one or more sensor mesh network nodes with sensor measurement information that indicates either directly or after processing by the gateway that a mesh network configuration change is required. For example, the sensor mesh network node makes a measurement once a minute and reports to the gateway once every five.

In 1202, it is determined if a machine health monitoring event has occurred. A machine health monitoring event can be that a sensor has a reading above a threshold or multiple sensors each have readings above their respective thresholds. If a machine health monitoring event has occurred, then in 1204 the network configuration is set to interrogate the sensor mesh network node and accept a burst of diagnostic information from the node. For example, if a sensor registers readings above its threshold, then the sensor mesh network node determines that a machine health monitoring event has occurred and indicates that a change to the mesh network configuration is required. In some embodiments, the gateway indicates that a machine health monitoring event has occurred in the event that a sensor in the network registers a reading above its threshold. The burst from the node requires that the network configuration must be increased from the sensor mesh network node. In 1206, it is determined if the diagnostic burst of information is complete. If the diagnostic burst is complete, then control passes to 1200. If the diagnostic burst is not complete, then control passes to 1204.

In some embodiments, an event such as a machine health monitoring event indicates that a change in configuration is required where the configuration is a high reliability configuration. High reliability for the network can include sending multiple copies of the message (or packet) along the same or different paths to reach the destination node, increasing the transmission power to increase the signal to noise and therefore the success of receiving an uncorrupted message, or any other appropriate method for increasing the reliability of transmission in the mesh network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of configuring mesh networks based on an application comprising:
   receiving an indication that a status is changed;
   in the event that the change in status requires a change in a mesh network configuration, wherein the mesh network comprising a communication network including a plurality of radio nodes:
      transmitting a notice to change the mesh network configuration from a first configuration to a second configuration, wherein the first configuration is associated with a first wireless network element operating life time, which is different from a second wireless network element operating life time that is associated with the second configuration, wherein the first network element operating life time and the second wireless network element operating life time are associated with a node of the plurality of radio nodes that has a battery as a power source; and
      initiating a local change required for the change in the mesh network configuration, wherein the local change comprises operating using a frame associated with the second configuration having a schedule of usage for one or more time slots and one or more channels corresponding to the second wireless network element operating life time.

2. A method as in claim 1, wherein the indication comprises a message in a packet.

3. A method as in claim 1, wherein the indication comprises a signal from a sensor.

4. A method as in claim 1, wherein the indication comprises a measurement from a sensor.

5. A method as in claim 1, wherein the indication comprises information derived from a sensor reading.

6. A method as in claim 1, wherein the status is changed because of a building automation monitoring event.

7. A method as in claim 1, wherein the status is changed because of an industrial automation monitoring event.

8. A method as in claim 1, wherein the status is changed because of a security monitoring event.

9. A method as in claim 1, wherein the status is changed because of a low battery monitoring event.

10. A method as in claim 1, wherein the status is changed because of a structural monitoring event.

11. A method as in claim 1, wherein the status is changed because of an intrusion detection event.

12. A method as in claim 1, wherein the status is changed because of a machine health monitoring event.

13. A method as in claim 1, wherein the notice comprises a message in a packet.

14. A method as in claim 1, wherein the notice is transmitted to a mesh network node.

15. A method as in claim 1, wherein the notice is transmitted to a gateway node.

16. A method as in claim 1, wherein the change to the mesh network configuration comprises a mesh network configuration to increase lifetime of a battery of a node.

17. A method as in claim 1, wherein the change to the mesh network configuration comprises a mesh network configuration to decrease latency in the transmission of a message sent from a node to a gateway node.

18. A method as in claim 1, wherein the change to the mesh network configuration comprises a mesh network configuration to increase throughput of packets through the network.

19. A method as in claim 1, wherein the change to the mesh network configuration comprises a mesh network configuration to increase throughput of packets through the network wherein a plurality of gateways are coupled to a network.

20. A method as in claim 1, wherein the change to the mesh network configuration comprises a mesh network configuration to increase reliability of a message reaching its destination.

21. A method as in claim 1, wherein the change to the mesh network configuration comprises a mesh network configuration to increase security of a message sent through the mesh network.

22. A method as in claim 1, wherein the local change comprises changing the mesh network routing.

23. A method as in claim 1, wherein the local change comprises adding a frame.

24. A method as in claim 1, wherein the local change comprises removing a frame.

25. A method as in claim 1, wherein the local change comprises changing the radio characteristics of a node.

26. A method as in claim 1, wherein the local change comprises changing the encoding for data in a packet.

27. A method as in claim 1, wherein the local change comprises fragmenting data into a plurality of packets.

28. A method of configuring mesh networks based on an application comprising:
   receiving a notice to change a mesh network configuration, wherein the mesh network comprising a communication network including a plurality of radio nodes;
   transmitting a notice to change the mesh network from a first configuration to a second configuration, wherein the first configuration is associated with a first wireless network element operating life time, which is different from a second wireless network element operating life time that is associated with the second configuration, wherein the first network element operating life time and the second wireless network element operating life time are associated with a node of the plurality of radio nodes that has a battery as a power source; and
   initiating the local change required for the change in the mesh network configuration, wherein the local change comprises operating using a frame associated with the second configuration having a schedule of usage for one or more time slots and one or more channels corresponding to the second wireless network element operating life time.

29. A computer program product for configuring mesh networks based on an application, the computer program product being embodied in a computer readable storage medium and comprising computer instructions for:
   receiving an indication that a status is changed;
   in the event that the change in status requires a change in a mesh network configuration, the mesh network comprising a communication network that includes a plurality of wireless radio nodes:
      transmitting a notice to change the mesh network from a first configuration to a second configuration, wherein the first configuration is associated with a first wireless network element operating life time, which is different from a second wireless network element operating life time that is associated with the second configuration, wherein the first network element operating life time and the second wireless network element operating life time are associated with a node of the plurality of radio nodes that has a battery as a power source; and
      initiating a local change required for the change in the mesh network configuration, wherein the local change comprises operating using a frame associated with the second configuration having a schedule of usage for one or more time slots and one or more channels corresponding to the second wireless network element operating life time.

30. A system for configuring mesh networks based on an application comprising:
   a processor; and
   a memory coupled with the processor, wherein the memory is configured to provide the processor with instructions which when executed cause the processor to:
   receive an indication that a status is changed;
   in the event that the change in status requires a change in a mesh network configuration, the mesh network comprising a communication network that includes a plurality of wireless radio nodes:
      transmit a notice to change the mesh network from a first configuration to a second configuration, wherein the first configuration is associated with a first wireless network element operating life time, which is different from a second wireless network element operating life time that is associated with the second configuration, wherein the first network element operating life time and the second wireless network element operating life time are associated with a node of the plurality of radio nodes that has a battery as a power source; and
      initiate a local change required for the change in the mesh network configurations, wherein the local change comprises operating using a frame associated with the second configuration having a schedule of usage for one or more time slots and one or more channels corresponding to the second wireless network element operating life time.

* * * * *

UNITED STATES PATENT AND TRADEMARK OFFICE
CERTIFICATE OF CORRECTION

| | | |
|---|---|---|
| PATENT NO. | : 7,630,326 B1 | Page 1 of 1 |
| APPLICATION NO. | : 11/371317 | |
| DATED | : December 8, 2009 | |
| INVENTOR(S) | : Robert M. Shear | |

It is certified that error appears in the above-identified patent and that said Letters Patent is hereby corrected as shown below:

Column 12, line 46
Delete "configurations" and insert -- configuration --

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,630,326 B1  Page 1 of 1
APPLICATION NO. : 11/371317
DATED : December 8, 2009
INVENTOR(S) : Robert M. Shear It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Second Day of November, 2010

David J. Kappos
*Director of the United States Patent and Trademark Office*